US012657860B2

(12) United States Patent
Chen et al.

(10) Patent No.: US 12,657,860 B2
(45) Date of Patent: Jun. 16, 2026

(54) OBJECT DETECTION METHOD AND OBJECT DETECTION APPARATUS

(71) Applicant: HIMAX TECHNOLOGIES LIMITED, Tainan City (TW)

(72) Inventors: Tzu-Hsu Chen, Tainan City (TW); Bo-Ying Huang, Tainan City (TW); Ti-Wen Tang, Tainan City (TW)

(73) Assignee: HIMAX TECHNOLOGIES LIMITED, Tainan City (TW)

( * ) Notice: Subject to any disclaimer, the term of this patent is extended or adjusted under 35 U.S.C. 154(b) by 295 days.

(21) Appl. No.: 18/409,826

(22) Filed: Jan. 11, 2024

(65) Prior Publication Data

US 2025/0232551 A1    Jul. 17, 2025

(51) Int. Cl.
| | |
|---|---|
| *G06V 10/20* | (2022.01) |
| *G06T 7/20* | (2017.01) |
| *G06V 10/82* | (2022.01) |
| *H04N 19/164* | (2014.01) |
| *H04N 19/18* | (2014.01) |
| *H04N 19/625* | (2014.01) |
| *H04N 19/70* | (2014.01) |

(52) U.S. Cl.
CPC .............. *G06V 10/20* (2022.01); *G06T 7/20* (2013.01); *G06V 10/82* (2022.01); *H04N 19/164* (2014.11); *H04N 19/18* (2014.11); *H04N 19/625* (2014.11); *H04N 19/70* (2014.11); *G06T 2207/20084* (2013.01)

(58) Field of Classification Search
CPC .......... G06V 10/20; G06V 10/82; G06T 7/20; G06T 2207/20084; G06T 7/70; H04N 19/164; H04N 19/18; H04N 19/625; H04N 19/70
See application file for complete search history.

(56) References Cited

U.S. PATENT DOCUMENTS

| | | | | |
|---|---|---|---|---|
| 5,892,847 A | * | 4/1999 | Johnson .................. | H04N 19/80 |
| | | | | 375/E7.193 |
| 6,295,089 B1 | * | 9/2001 | Hoang ................... | H04N 19/59 |
| | | | | 375/240.18 |
| 2014/0369408 A1 | * | 12/2014 | Tanaka ................. | H04N 19/463 |
| | | | | 375/240.03 |
| 2016/0234520 A1 | | 8/2016 | Goel | |
| 2016/0234521 A1 | * | 8/2016 | Goel .................... | H04N 19/625 |
| 2018/0184099 A1 | * | 6/2018 | Goel .................... | H04N 19/44 |
| 2020/0329233 A1 | * | 10/2020 | Nemirofsky ......... | H04N 19/136 |

* cited by examiner

*Primary Examiner* — Iriana Cruz
(74) *Attorney, Agent, or Firm* — JCIPRNET

(57) ABSTRACT

An object detection method and an object detection apparatus are disclosed. In the object detection method, a bitstream of a progressively encoded JPEG image is fetched from an image supply device, wherein the bitstream includes a header and a subset of a plurality of discrete cosine transform (DCT) coefficients of the JPEG image, the subset of the DCT coefficients is decoded according to information in the header to reconstruct a coarse scan image of the JPEG image; and an object detection is performed on the coarse scan image to detect an object in the JPEG image.

10 Claims, 7 Drawing Sheets

Send a first request for a DC coefficient and a plurality of AC coefficients near the DC coefficient to the image supply device to fetch the bitstream comprising the header, the DC coefficient and the plurality of AC coefficients ~S402

Send a second request for a number of a plurality of AC coefficients other than the plurality of AC coefficients near the DC coefficient to the image supply device to fetch a bitstream comprising the number of the plurality of AC coefficients ~S404

Decode the DC coefficient and the AC coefficients according to information in the header to reconstruct a coarse scan image of the JPEG image ~S406

Perform an object detection on the coarse scan image to detect an object in the JPEG image ~S408

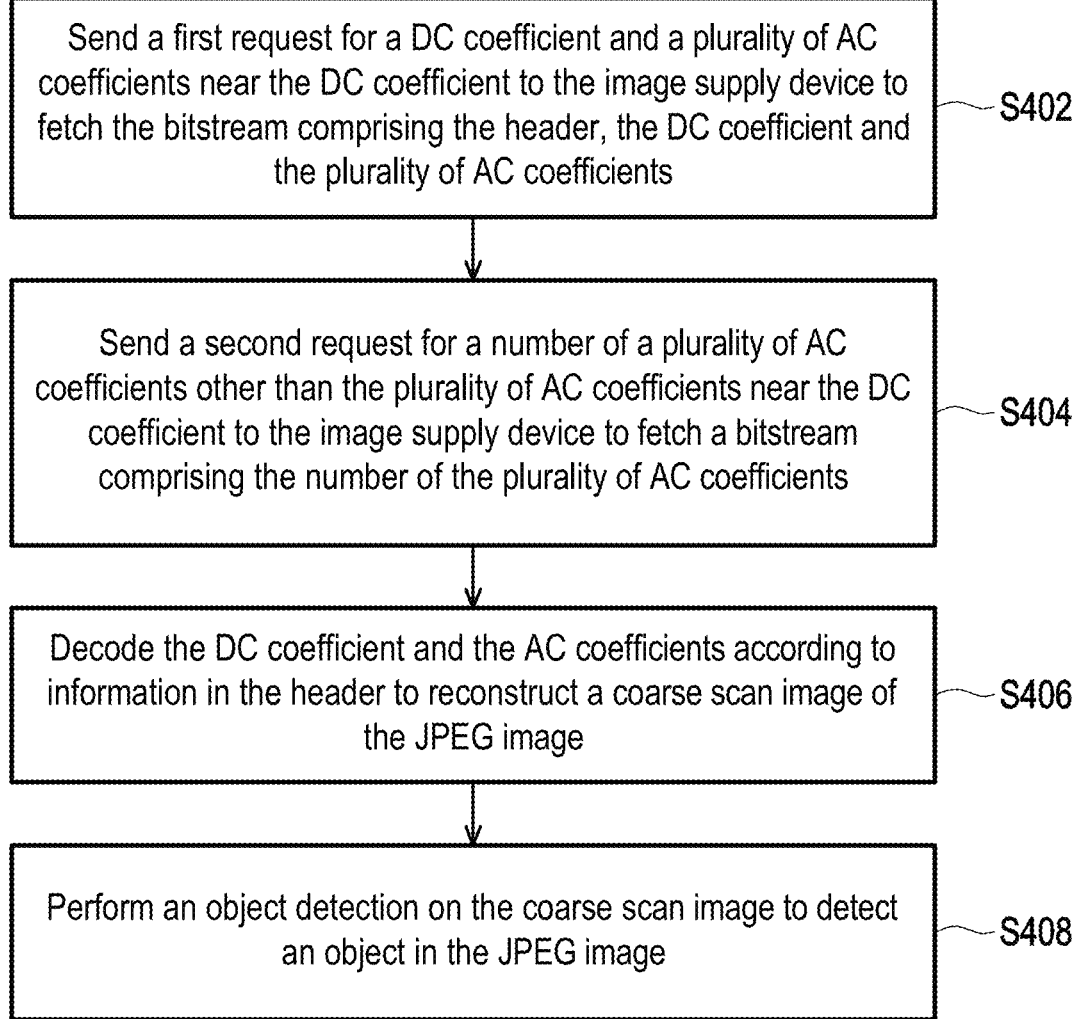

Send a first request for a DC coefficient and a plurality of AC coefficients near the DC coefficient to the image supply device to fetch the bitstream comprising the header, the DC coefficient and the plurality of AC coefficients — S402

Send a second request for a number of a plurality of AC coefficients other than the plurality of AC coefficients near the DC coefficient to the image supply device to fetch a bitstream comprising the number of the plurality of AC coefficients — S404

Decode the DC coefficient and the AC coefficients according to information in the header to reconstruct a coarse scan image of the JPEG image — S406

Perform an object detection on the coarse scan image to detect an object in the JPEG image — S408

FIG. 4

0xFFD8  SOI: Start of Image
0xFFE0  APP0: JFIF Tag
0xFFDB  DQT: Quantization Tables
0xFFC2  SOF2: Progressive DCT
0xFFC4  DHT: Definition of Huffman Tables
0xFFDA  SOS: Start of Scan
52
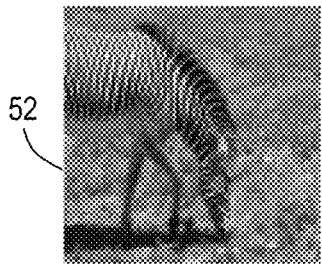
First request
0xFFC4  DHT: Definition of Huffman Tables
0xFFDA  SOS: Start of Scan
54
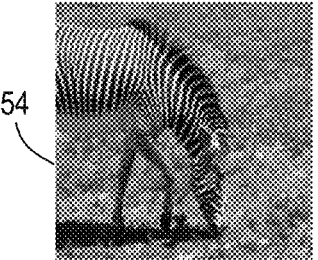
Second request
0xFFC4  DHT: Definition of Huffman Tables
0xFFDA  SOS: Start of Scan
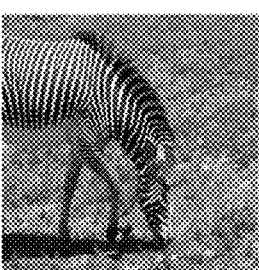
0xFFD9  EOI: End of Image
FIG. 5B

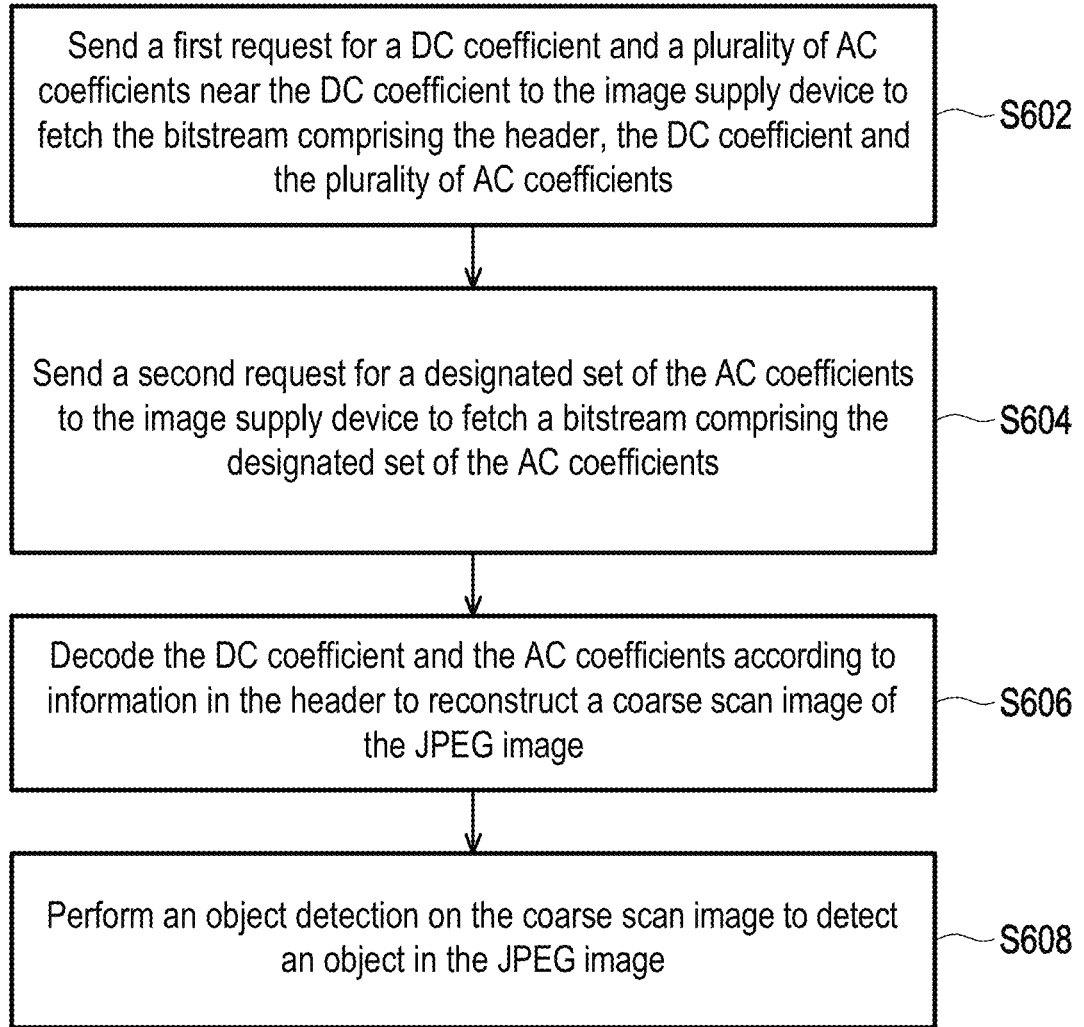

Send a first request for a DC coefficient and a plurality of AC coefficients near the DC coefficient to the image supply device to fetch the bitstream comprising the header, the DC coefficient and the plurality of AC coefficients ~S602

Send a second request for a designated set of the AC coefficients to the image supply device to fetch a bitstream comprising the designated set of the AC coefficients ~S604

Decode the DC coefficient and the AC coefficients according to information in the header to reconstruct a coarse scan image of the JPEG image ~S606

Perform an object detection on the coarse scan image to detect an object in the JPEG image ~S608

FIG. 6

OBJECT DETECTION METHOD AND OBJECT DETECTION APPARATUS

BACKGROUND

Field of the Invention

The present invention relates to image processing, and more particularly to an object detection method and an object detection apparatus.

Description of Related Art

With the widespread usage of surveillance, the demand for analyzing surveillance images to detect suspected persons or interested objects has increased. In general, the image data coming from a surveillance camera needs to be compressed and placed in a memory so as to be fetched by an object detection model and used to detect the objects within the image.

Joint Photographic Experts Group (JPEG), which is a commonly used method of lossy compression for digital images, is usually used to compress the image data of the surveillance camera. The JPEG uses a lossy form of compression based on Discrete Cosine Transform (DCT) that converts an image from a spatial domain into a frequency domain. The quantized DCT coefficients are sequenced and losslessly packed into an output bitstream for transmission.

However, as an available bandwidth of the network connected by an end device is limited or a system bus of the end device is busy, an efficiency of object detection performed by the end device will be reduced due to a latency of data transmission.

SUMMARY OF THE INVENTION

The disclosure is directed to an object detection method and an object detection apparatus, capable of performing object detection for designated application.

The disclosure provides a method an object detection method adapted to an end device having a processor. The method includes: fetching a bitstream of a progressively encoded JPEG image from an image supply device, wherein the bitstream comprises a header and a subset of a plurality of discrete cosine transform (DCT) coefficients of the JPEG image; decoding the subset of the DCT coefficients according to information in the header to reconstruct a coarse scan image of the JPEG image; and performing an object detection on the coarse scan image to detect an object in the JPEG image.

In some embodiments, the plurality of DCT coefficients of the JPEG image comprise a DC coefficient and a plurality of AC coefficients near the DC coefficient required for reconstructing the coarse scan image of the JPEG image.

In some embodiments, the step of fetching the bitstream of the progressively encoded JPEG image from the image supply device comprises sending a first request for the DC coefficient and the plurality of AC coefficients near the DC coefficient to the image supply device to fetch the bitstream comprising the header and the AC coefficients as the subset of the DCT coefficients.

In some embodiments, the step of fetching the bitstream of the progressively encoded JPEG image from the image supply device comprises sending a first request for the DC coefficient and the plurality of AC coefficients to the image supply device to fetch the bitstream comprising the header and the plurality of AC coefficients as a portion of the subset of the DCT coefficients; and sending a second request for a number of a plurality of AC coefficients other than the plurality of AC coefficients near the DC coefficient to the image supply device to fetch a bitstream comprising the number of the plurality of AC coefficients as an another portion of the subset of the DCT coefficients.

In some embodiments, the step of fetching the bitstream of the progressively encoded JPEG image from the image supply device comprises sending a first request for the DC coefficient and the plurality of AC coefficients near the DC coefficient to the image supply device to fetch the bitstream comprising the header and the plurality of AC coefficients as a portion of the subset of the DCT coefficients; and sending a second request for a designated set of the AC coefficients to the image supply device to fetch a bitstream comprising the designated set of the AC coefficients as an another portion of the subset of the DCT coefficients, wherein the designated set of the AC coefficients to be fetched is determined in accordance with a designated application for the object detection.

In some embodiments, the method further includes detecting a motion in the reconstructed progressive scan image of the JPEG image; and triggering execution of the object detection on the reconstructed progressive scan image in response to detecting the motion.

The disclosure provides an object detection apparatus including a data acquisition device, a storage device and a processor. The data acquisition device is configured to connect an image supply device. The storage device is configured to store data. The processor is coupled to the data acquisition device and the storage device, and configured to fetch a bitstream of a progressively encoded JPEG image from the image supply device by using the data acquisition device, wherein the bitstream comprises a header and a subset of a plurality of DCT coefficients of the JPEG image, decode the subset of the DCT coefficients according to information in the header to reconstruct a coarse scan image of the JPEG image, and perform an object detection on the coarse scan image to detect an object in the JPEG image.

In some embodiments, the plurality of DCT coefficients of the JPEG image comprise a DC coefficient and a plurality of AC coefficients near the DC coefficient required for reconstructing a coarse scan image of the JPEG image.

In some embodiments, the processor is configured to send a first request for the DC coefficient and the plurality of AC coefficients to the image supply device to fetch the bitstream comprising the header and the plurality of AC coefficients as the subset of the DCT coefficients.

In some embodiments, the processor is configured to send a first request for the DC coefficient and the plurality of AC coefficients near the DC coefficient to the image supply device to fetch the bitstream comprising the header and the plurality of AC coefficients as a portion of the subset of the DCT coefficients, and send a second request for a number of a plurality of AC coefficients other than the plurality of AC coefficients near the DC coefficient to the image supply device to fetch a bitstream comprising the number of the plurality of AC coefficients as an another portion of the subset of the DCT coefficients.

In some embodiments, the processor is configured to send a first request for the DC coefficient and the plurality of AC coefficients near the DC coefficient to the image supply device to fetch the bitstream comprising the header and the plurality of AC coefficients as a portion of the subset of the DCT coefficients, and send a second request for a designated set of the AC coefficients to the image supply device to fetch a bitstream comprising the designated set of the AC coefficients as an another portion of the subset of the DCT coefficients.

In some embodiments, the processor is further configured to detect a motion in the reconstructed progressive scan image of the JPEG image, and trigger execution of the object detection on the reconstructed progressive scan image in response to detecting the motion.

In some embodiments, the subset of the plurality of DCT coefficients of the JPEG image in the bitstream is determined in accordance with a bandwidth for transmitting the bitstream, and the bandwidth comprises a network bandwidth of a network that connects the image supply device and the end device, or a bus bandwidth of a bus that connects the image supply device and the processor.

In some embodiments, the object detection is performed by using a deep learning model and the deep learning model comprises a convolutional neural network (CNN), a recurrent neural network (RNN), or a long short-term memory (LSTM) recurrent neural network.

To make the aforementioned more comprehensible, several embodiments accompanied with drawings are described in detail as follows.

BRIEF DESCRIPTION OF THE DRAWINGS

FIG. 4 is a flowchart of an object detection method according to an embodiment of the disclosure.

FIG. 5A and FIG. 5B are schematic diagrams illustrating reconstruction of progressive scan image according to an embodiment of the disclosure.

FIG. 6 is a flowchart of an object detection method according to an embodiment of the disclosure.

DESCRIPTION OF EMBODIMENTS

A JPEG technology that encodes an image in multiple passes of progressively higher detail is called Progressive JPEG, and a Progressive JPEG bitstream is transmitted by sending successive approximations of a JPEG image over a network in a succession. A JPEG encoder converts a JPEG image from a spatial domain into a frequency domain to generate Discrete Cosine Transform (DCT) coefficients for all the components of the JPEG image. The DCT coefficients are transmitted in the bitstream of the JPEG image over a network, and as soon as a subset of the DCT coefficients (e.g. low-frequency coefficients) partitioned by the JPEG encoder is fetched, an image that is a coarse approximation of the original JPEG image is displayed. As more DCT coefficients (e.g. high-frequency coefficients) partitioned by the JPEG encoder are fetched, they are decoded along with the previously fetched DCT coefficients, and an image, which is an improvement over the previous coarse approximation of the original JPEG image, is displayed. The DCT coefficients are divided into "DC coefficient" and "AC coefficients". DC coefficient is the coefficient with zero frequency in both dimensions, and AC coefficients are remaining 63 coefficients with non-zero frequencies. The DC coefficient that features the average intensity of the pixels in the block and AC coefficients representing variations in intensity between pixels in the block. In this embodiment, the AC coefficients are divided into low-frequency coefficients and high-frequency coefficients based on a frequency threshold. Relative to the high-frequency coefficients, the low-frequency coefficients are near zero frequency (near the DC coefficient).

Accordingly, the present disclosure fetches a designated set of the DCT coefficients and uses the same to reconstruct an approximation scan of a progressively encoded JPEG image in accordance with the circumstance or scene, so as to support object detection for a designated application, in which low-frequency coefficients of the JPEG image are fetched to reconstruct a coarse scan image, and then object detection is performed on the coarse scan image to detect an object in the JPEG image. As the data required for reconstructing the image for object detection is reduced, and the objection detection is performed on the coarse scan image, an efficiency of the object detection can be improved.

Figure 1:
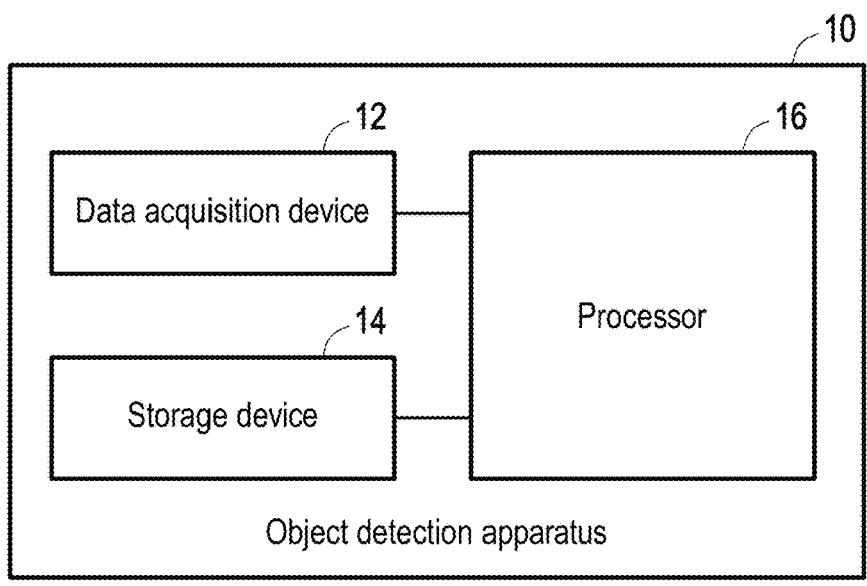
FIG. 1 is a block diagram of an object detection apparatus according to an embodiment of the disclosure.

FIG. 1 is a block diagram of an object detection apparatus according to an embodiment of the disclosure. Referring to FIG. 1, the object detection apparatus 10 of the embodiment is, for example, a personal computer (PC), a server, a workstation, a smart phone, a tablet PC, or other end devices with computing functions, and includes a data acquisition device 12, a storage device 14 and a processor 16, and the functions thereof are described as follows.

The data acquisition device 12 is, for example, a wired connection device such as a universal serial bus (USB), RS232, a universal asynchronous receiver/transmitter (UART), an internal integrated circuit (I2C), a serial peripheral interface (SPI), a display port, a thunderbolt, or a local area network (LAN) interface, or a wireless connection device supporting communication protocol such as wireless fidelity (Wi-Fi), Wi-Fi Direct, (radio-frequency identification, RFID), Bluetooth, infrared, near-field communication (NFC), or device-to-device (D2D), which is not limited thereto. The data acquisition device 12 is configured to connect an image supply device so as to fetch a bitstream of a progressively encoded JPEG image from the image supply device.

The image supply device is, for example, a computer, a server, a workstation, or other remote devices that stores JPEG images encoded in a progressive JPEG format. In some embodiments, the image supply device may be an image capturing device including a charge coupled device (CCD), a complementary metal-oxide semiconductor (CMOS) device or other types of photosensitive device, and is configured to capture images and encode the captured images in the progressive JPEG format. In some embodiments, the image supply device is a memory disposed in the object detection apparatus 10 and the JPEG images stored thereon are transmitted as a bitstream to the processor 16 through the data acquisition device 12 (e.g. a system bus). The embodiment does not limit the type and the configuration of the image supply device.

The storage device 14 is, for example, any type of fixed or removable random-access memory (RAM), read-only memory (ROM), flash memory, hard disk drive, other similar devices, or a combination of the devices to store a program executable by the processor 16. In some embodiments, the storage device 14 may store a deep learning model trained by a plurality of data sets generated under respective conditions, in which each of the data sets may include a progressive scan image and at least an object identified within the progressive scan image, and may include a progressive scan image without the object. The deep learning model is, for example, a convolutional neural network (CNN), a recurrent neural network (RNN), or a long short-term memory (LSTM) recurrent neural network, which is not limited by the disclosure.

In some embodiments, the deep learning model is trained for various designated applications for the object detection. That is, for applications such as face recognition or machine vision, a composition of the DCT coefficients (e.g. a combination of specific low-frequency and/or high-frequency coefficients) of the JPEG image suitable for the application may vary. Accordingly, the deep learning model may be trained with various progressive scan images that are reconstructed with various compositions of the DCT coefficients applicable to various applications for the object detection, so as to support object detection for various applications.

The processor 16 is coupled to the data acquisition device 12 and the storage device 14 and configured to control the operation of the object detection apparatus 10. In some embodiments, the processor 16 is, for example, a central processing unit (CPU), other programmable general-purpose or specific-purpose microprocessors, digital signal processors (DSPs), programmable controllers, application specific integrated circuits (ASICs), field programmable gate arrays (FPGAs), programmable logic controllers (PLCs), other similar devices, or a combination of the devices to load and execute the program stored in the storage device 14, so as to execute the object detection method of the embodiment of the disclosure.

Figure 2:
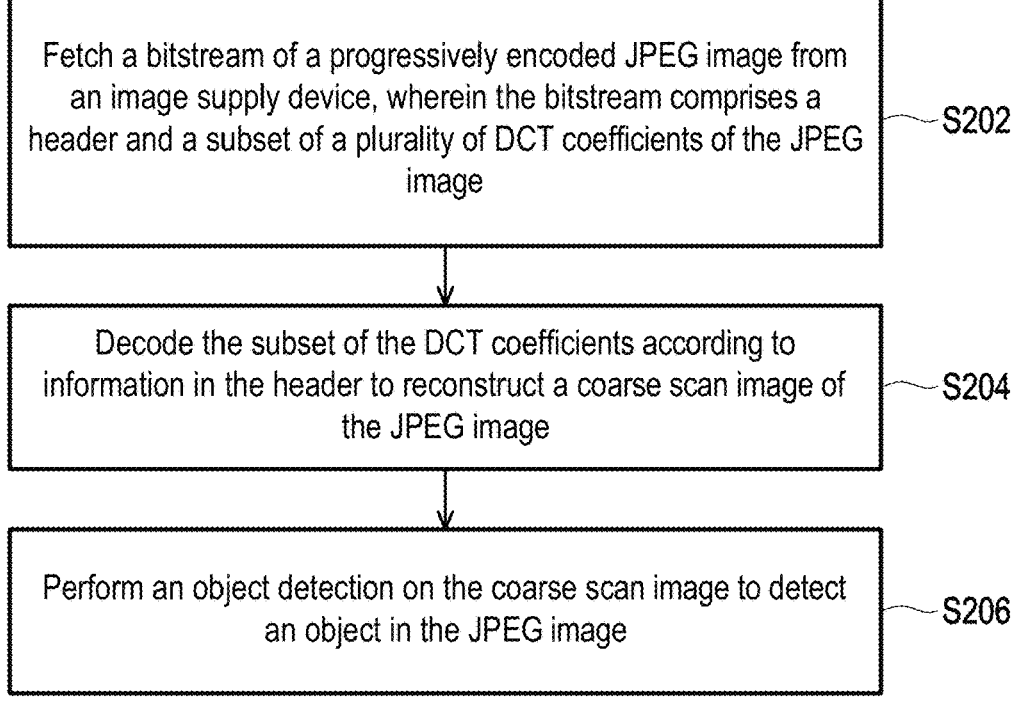
FIG. 2 is a flowchart of an object detection method according to an embodiment of the disclosure.

FIG. 2 is a flowchart of an object detection method according to an embodiment of the disclosure. Referring to FIG. 1 and FIG. 2, the method of the embodiment is adapted for the object detection apparatus 10 in FIG. 1. The detailed steps of the object detection method according to the embodiment of the disclosure are described in detail below in conjunction with various components of the object detection apparatus 10.

In Step S202, the processor 16 of the object detection apparatus 10 fetches a bitstream of a progressively encoded JPEG image from an image supply device by the data acquisition device 12. The bitstream includes a header and a subset of a plurality of discrete cosine transform (DCT) coefficients of the JPEG image.

In some embodiments, the subset of the DCT coefficients is determined in accordance with a bandwidth for transmitting the bitstream. The bandwidth is, for example, a network bandwidth of a network that connects the image supply device and the object detection apparatus 10, or a bus bandwidth of a bus that connects the image supply device and the processor 16, which is not limited by the disclosure.

In some embodiments, the processor 16 detects the bandwidth through transceiving test packages by the data acquisition device 12 so as to determine the subset of the DCT coefficients suitable for transmission under a current circumstance, and then the processor 16 sends a request for a designated subset of the DCT coefficients to the image supply device so as to fetch the bitstream including the header and the designated subset of the DCT coefficients from the image supply device.

In Step S204, the processor 16 decodes the fetched subset of the DCT coefficients according to information in the header to reconstruct a coarse scan image of the JPEG image. In detail, the processor 16 may parse the header in the bitstream to determine if the bitstream to be decoded is a progressive, sequential, hierarchical or lossless JPEG bitstream, and specify the entropy decoding (e.g. Huffman or arithmetic decoding) and the quantization table to be used for decoding. Then, the processor 16 performs an entropy decoding operation on the bitstream using the specified entropy decoding table to generate quantized DCT coefficients, performs an inverse quantization operation on the quantized DCT coefficients using the specified quantization table to generate inverse quantized DCT coefficients, repeatedly performs an inverse DCT operation on the inverse quantized DCT coefficients to generate image samples of an image component, and finally reconstruct the coarse scan image when all the minimum coded units (MCUs)/data units are decoded.

In Step S206, the processor 16 performs an object detection on the coarse scan image to detect an object in the JPEG image. In some embodiments, the processor 16 performs the object detection by using a deep learning model trained by a plurality of data sets generated under respective conditions, in which each of the data sets may include a progressive scan image and at least an object identified within the progressive scan image, and may include a progressive scan image without the object. As illustrated above, the deep learning model may be trained for various levels of bandwidth or various designated applications for the object detection, such that when the reconstructed coarse scan image is input into the deep learning model along with the designated application, the deep learning model can adopts the weights in hidden layers of the neural network optimized for the application so as to obtain an ideal detection result.

In some embodiments, the processor 16 may detect a motion in the reconstructed coarse scan image of the JPEG image and trigger execution of the object detection on the reconstructed coarse scan image in response to detecting the motion. The processor 16 may detect the motion by calculating differences between the currently reconstructed coarse scan image with a previously reconstructed coarse scan image, but the embodiment is not limited thereto.

It is noted that the DCT coefficients of the JPEG image include a DC coefficient and a plurality of AC coefficients near the DC coefficient required for reconstructing a coarse scan image of the JPEG image and a plurality of AC coefficients required for reconstructing a plurality of progressive scan images of the JPEG image with improved quality. Accordingly, in some embodiments, only a portion of the AC coefficients are fetched to reconstruct a coarse scan image for object detection. Further, in some embodiments, the DC coefficient and a designated set of AC coefficients are fetched to reconstruct the coarse scan image for object detection in accordance with the designated application for the object detection.

Figure 3:
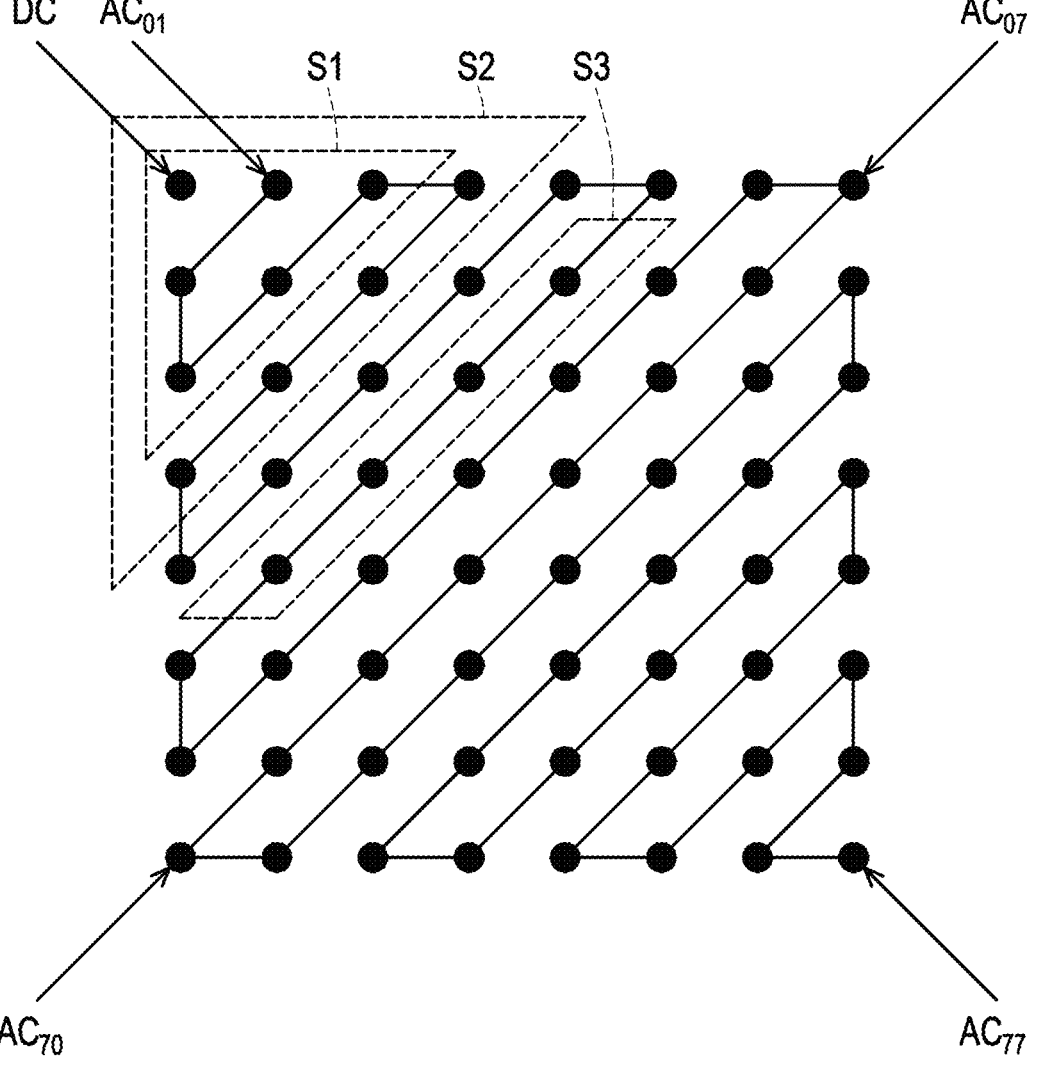
FIG. 3 is an ordering of the DCT coefficients according to an embodiment of the disclosure.

For example, FIG. 3 is an ordering of the DCT coefficients according to an embodiment of the disclosure. Referring to FIG. 3, a source JPEG image may be partitioned into minimum coded units (MCUs)/data units by an encoder. A data unit is, for example, 8×8 block of samples of one component in DCT-based processes. The encoder may perform a mathematical transformation of the data unit to convert a block of samples into a corresponding block of DCT coefficients including a DC coefficient DC and multiple AC coefficients $AC_{01}$ to $AC_{77}$ in a zig-zag order.

Accordingly, in reconstructing the coarse scan image for object detection, a subset S1 of the DCT coefficients including the DC coefficient DC and the AC coefficients $AC_{01}$, $AC_{10}$, $AC_{20}$, $AC_{11}$, $AC_{02}$ are requested and fetched by the object detection apparatus to reconstruct a coarse scan image of the JPEG image, or a subset S2 of the DCT coefficients including the DC coefficient DC, the low-frequency AC coefficients $AC_{01}$, $AC_{10}$, $AC_{20}$, $AC_{11}$, $AC_{02}$ and the high-frequency AC coefficients $AC_{30}$, $AC_{21}$, $AC_{12}$, $AC_{03}$ are requested and fetched by the object detection apparatus to reconstruct a coarse scan image with improved quality. In some embodiments, a subset S3 of the DCT coefficients including the designated high-frequency AC coefficients $AC_{41}$, $AC_{32}$, $AC_{23}$, $AC_{14}$ along with the subset S1 of the DCT coefficients are requested and fetched by the object detection apparatus to reconstruct a coarse scan image suitable for a designated application for the object detection such as face recognition or machine vision.

FIG. 4 is a flowchart of an object detection method according to an embodiment of the disclosure. Referring to FIG. 1 and FIG. 4, the method of the embodiment is adapted for the object detection apparatus 10 in FIG. 1. The detailed steps of the object detection method according to the embodiment of the disclosure are described in detail below in conjunction with various components of the object detection apparatus 10.

In Step S402, the processor 16 of the object detection apparatus 10 sends a first request for a DC coefficient and a plurality of AC coefficients near the DC coefficient to the image supply device to fetch the bitstream comprising the header, the DC coefficient and the plurality of AC coefficients by the data acquisition device 12.

In Step S404, the processor 16 sends a second request for a number of the plurality of AC coefficients other than the plurality of AC coefficients near the DC coefficient to the image supply device to fetch a bitstream comprising the number of the plurality of AC coefficients by the data acquisition device 12.

In Step S406, the processor 16 decodes the fetched DC coefficient and AC coefficients according to information in the header to reconstruct a coarse scan image of the JPEG image.

Figure 5A:
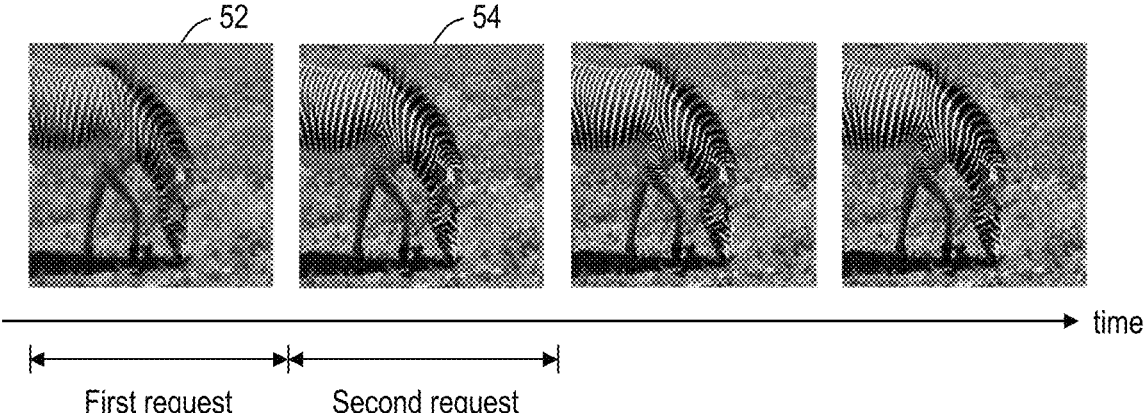

For example, FIG. 5A and FIG. 5B are schematic diagrams illustrating reconstruction of progressive scan image according to an embodiment of the disclosure. As shown in FIG. 5A, a progressive JPEG image is transmitted and decoded in multiple passes of progressively higher detail. Accordingly, the object detection apparatus of the embodiment sends a first request for a DC coefficient and the AC coefficients (i.e. low-frequency coefficients) near the DC coefficient to the image supply device so as to fetch the bitstream comprising the header, the DC coefficient and the AC coefficients, and decodes the DC coefficient and the AC coefficients according to information in the header to reconstruct a coarse scan image 52 of the JPEG image. Then, the object detection apparatus sends a second request for the AC coefficients (i.e. high-frequency coefficients) to the image supply device so as to fetch the bitstream comprising the AC coefficients, and decodes the DC coefficient and the AC coefficients according to information in the header so as to reconstruct a progressive scan image 54 with improved quality.

As shown in FIG. 5B, data of a progressive JPEG usually includes tens of sections starting from a marker (or called identifier) 0xFFDA and data of a progressive JPEG ends at a marker 0xFFD9, the sections respectively store the DCT coefficients of the JPEG image from low-frequency to high-frequency. The object detection apparatus may send a first request for a section starting from 0xFFD8 to the image supply device so as to fetch data stored in the section and obtain a JFIF tag, quantization tables, indication of progressive DCT, a definition of Huffman tables, and the low-frequency coefficients for reconstructing the coarse scan image 52 of the JPEG image. Then, the object detection apparatus sends a second request for a section starting from 0xFFC4 to the image supply device so as to fetch data stored in the section and obtain high-frequency coefficients for reconstructing the progressive scan image 54 with improved quality. As the high-frequency coefficients are fetched, they are decoded in conjunction with previous fetched low-frequency coefficients to update the previously reconstructed coarse scan image 52 to a progressive scan image 54 with improved quality.

In Step S408, the processor 16 performs an object detection on the progressive scan image to detect an object in the JPEG image. In some embodiments, the processor 16 performs the object detection by using a deep learning model as illustrated above, and details thereof are omitted herein.

FIG. 6 is a flowchart of an object detection method according to an embodiment of the disclosure. Referring to FIG. 1 and FIG. 6, the method of the embodiment is adapted for the object detection apparatus 10 in FIG. 1. The detailed steps of the object detection method according to the embodiment of the disclosure are described in detail below in conjunction with various components of the object detection apparatus 10.

In Step S602, the processor 16 of the object detection apparatus 10 sends a first request for a DC coefficient and a plurality of AC coefficients to the image supply device to fetch the bitstream comprising the header, the DC coefficient and the plurality of AC coefficients by the data acquisition device 12.

In Step S604, the processor 16 sends a second request for a designated set of the plurality of AC coefficients to the image supply device to fetch a bitstream comprising the designated set of the plurality of AC coefficients. The number of the plurality of high-frequency coefficients to be fetched is determined in accordance with a designated application for the object detection.

In Step S606, the processor 16 decodes the fetched DC coefficient and AC coefficients according to information in the header to reconstruct a coarse scan image of the JPEG image.

In Step S608, the processor 16 performs an object detection on the coarse scan image to detect an object in the JPEG image. In some embodiments, the processor 16 performs the object detection by using a deep learning model as illustrated above, and details thereof are omitted herein.

Figure 7:
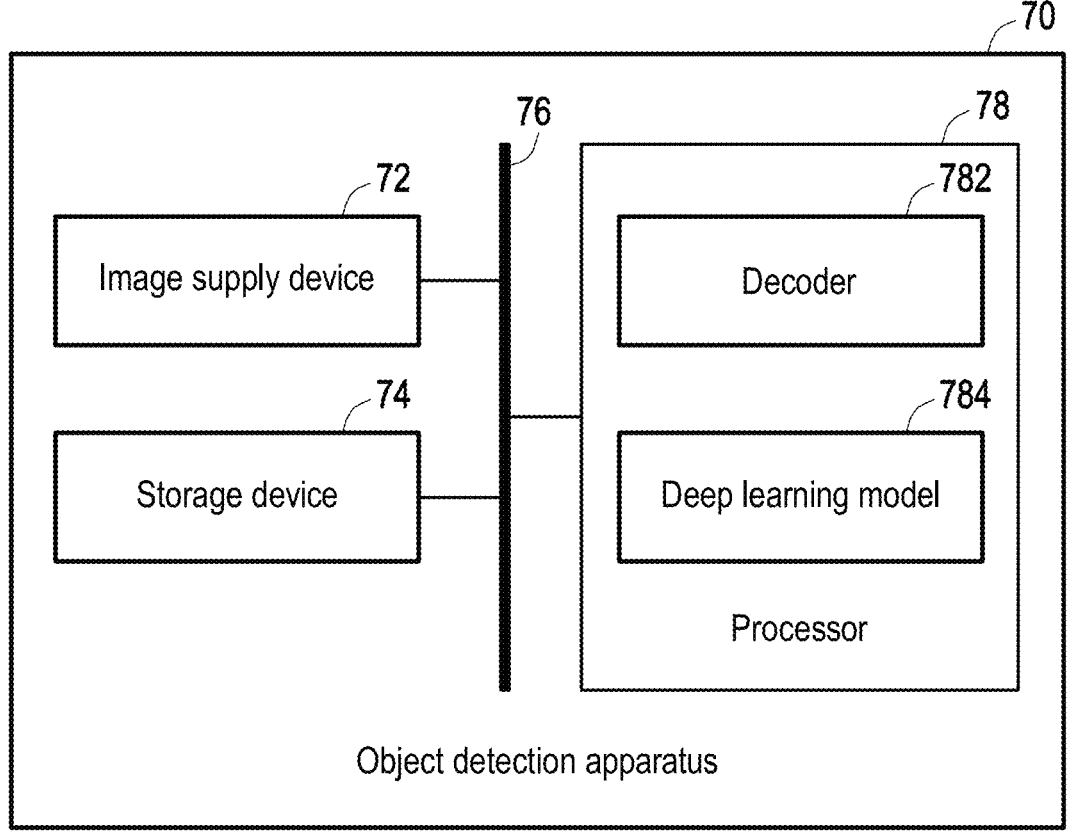
FIG. 7 is a block diagram of an object detection apparatus according to an embodiment of the disclosure.

FIG. 7 is a block diagram of an object detection apparatus according to an embodiment of the disclosure. Referring to FIG. 7, the object detection apparatus 70 of the embodiment is, for example, a personal computer (PC), a server, a workstation, a smart phone, a tablet PC, or other end devices with computing functions, and includes an image supply device 72, a storage device 74, a system bus 76 and a processor 78. In some embodiments, the object detection apparatus 70 may further include a controller for handling all data transmission sequences and configurations, and monitoring the bus to control the number of scans to be transmitted. Besides, the controller may control the decoder to decode a coarse image with low-frequency coefficients or a full image (normal mode).

The object detection apparatus 70 of the embodiment differs from the object detection apparatus 10 of the previous embodiment in that the image supply device 72 is disposed inside the object detection apparatus 10 and the bitstream of the progressively encoded JPEG image stored in the image supply device 72 is transmitted through a system bus 76 in the object detection apparatus 10.

The image supply device 72 is, for example, an internal volatile or non-volatile memory such as RAM, ROM, flash memory, or non-volatile RAM (NVRAM) used to store JPEG images.

The storage device 74 is, for example, any type of fixed or removable RAM, ROM, flash memory, hard disk drive, other similar devices, or a combination of the devices, and used to store a program executable by the processor 78 and store data of a deep learning model for object detection which is trained by a plurality of data sets generated under respective conditions.

The processor 78 is connected to the image supply device 72 and the storage device 74 through the system bus 76 and configured to control the operation of the object detection apparatus 70 to execute the object detection method of the embodiment of the disclosure. Specifically, the processor 78 may load the programs in the storage device 74 to execute a decoder 782 for decoding the DCT coefficients of a JPEG image so as to reconstruct the progressive scan image of the JPEG image. The processor 78 may further load the data in the storage device 74 to execute a deep learning model 784 for detecting an object in the progressive scan image. In some embodiments, the processor 78 can be implemented by a hardware intellectual property (IP) core, and is not limited herein.

Accordingly, in this embodiment, a subset of DCT coefficients of the JPEG image is transmitted to the processor 78 through the system bus 76 and decoded by the decoder 782 to reconstruct a coarse scan image, which is further used by the deep learning model 784 to detect the object in the JPEG image.

To sum up, in the object detection method and the object detection apparatus of the present invention, only a subset of DCT coefficients of the JPEG image is fetched to reconstruct a coarse scan image for object detection, such that the data required for reconstructing the image for object detection can be reduced. In addition, the deep learning model for object detection is also trained by using the progressive scan images generated under various conditions, the deep learning model optimized for the application is adopted, and an efficiency or an accuracy of the object detection can be enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An object detection method, adapted to an end device having a processor, comprising:
fetching a bitstream of a progressively encoded JPEG image from an image supply device, wherein the bitstream comprises a header and a subset of a plurality of discrete cosine transform (DCT) coefficients of the JPEG image, wherein the plurality of DCT coefficients comprise a DC coefficient and a plurality of AC coefficients near the DC coefficient, comprising:
sending a first request for the DC coefficient and the plurality of AC coefficients near the DC coefficient to the image supply device to fetch the bitstream comprising the header and the plurality of AC coefficients as a portion of the subset of the DCT coefficients,
sending a second request for a number of a plurality of AC coefficients other than the plurality of AC coefficients near the DC coefficient to the image supply device to fetch a bitstream comprising the number of the plurality of AC coefficients as an another portion of the subset of the DCT coefficients;

decoding the portion of the subset of the DCT coefficients according to information in the header to reconstruct a coarse scan image of the JPEG image;
decoding the another portion of the subset of the DCT coefficients according to information in the header to update the coarse scan image to a progressive scan image with improved quality; and
performing an object detection on the progressive scan image to detect an object in the JPEG image.

2. The method as claimed in claim 1, wherein the step of fetching the bitstream of the progressively encoded JPEG image from the image supply device further comprises:
sending a third request for a designated set of the AC coefficients to the image supply device to fetch a bitstream comprising the designated set of the AC coefficients as the another portion of the subset of the DCT coefficients, wherein the designated set of the AC coefficients to be fetched is determined in accordance with a designated application for the object detection.

3. The method as claimed in claim 1, further comprising:
detecting a motion in the reconstructed progressive scan image of the JPEG image; and
triggering execution of the object detection on the reconstructed progressive scan image in response to detecting the motion.

4. The method as claimed in claim 1, wherein the subset of the plurality of DCT coefficients of the JPEG image in the bitstream is determined in accordance with a bandwidth for transmitting the bitstream, and the bandwidth comprises a network bandwidth of a network that connects the image supply device and the end device, or a bus bandwidth of a bus that connects the image supply device and the processor.

5. The method as claimed in claim 1, wherein the object detection is performed by using a deep learning model and the deep learning model comprises a convolutional neural network (CNN), a recurrent neural network (RNN), or a long short-term memory (LSTM) recurrent neural network.

6. An object detection apparatus, comprising:
a data acquisition device, configured to connect an image supply device;
a storage device, configured to store data; and
a processor, coupled to the data acquisition device and the storage device, and configured to:
fetch a bitstream of a progressively encoded JPEG image from the image supply device by using the data acquisition device, wherein the bitstream comprises a header and a subset of a plurality of DCT coefficients of the JPEG image, wherein the plurality of DCT coefficients comprise a DC coefficient and a plurality of AC coefficients near the DC coefficient, wherein the processor is further configured to:
send a first request for the DC coefficient and the plurality of AC coefficients near the DC coefficient to the image supply device to fetch the bitstream comprising the header and the plurality of AC coefficients as a portion of the subset of the DCT coefficients,
sending a second request for a number of a plurality of AC coefficients other than the plurality of AC coefficients near the DC coefficient to the image supply device to fetch a bitstream comprising the number of the plurality of AC coefficients as an another portion of the subset of the DCT coefficients;
decode the portion of the subset of the DCT coefficients according to information in the header to reconstruct a coarse scan image of the JPEG image;

decoding the another portion of the subset of the DCT coefficients according to information in the header to update the coarse scan image to a progressive scan image with improved quality; and perform an object detection on the progressive scan image to detect an object in the JPEG image.

7. The object detection apparatus as claimed in claim 6, wherein the processor is configured to send a third request for a designated set of the AC coefficients to the image supply device to fetch a bitstream comprising the designated set of the AC coefficients as the another portion of the subset of the DCT coefficients, wherein the designated set of the AC coefficients to be fetched is determined in accordance with a designated application for the object detection.

8. The object detection apparatus as claimed in claim 6, wherein the processor is further configured to detect a motion in the reconstructed progressive scan image of the JPEG image, and trigger execution of the object detection on the reconstructed progressive scan image in response to detecting the motion.

9. The object detection apparatus as claimed in claim 6, wherein the subset of the plurality of DCT coefficients of the JPEG image in the bitstream is determined in accordance with a bandwidth for transmitting the bitstream, and the bandwidth comprises a network bandwidth of a network that connects the image supply device and the end device, or a bus bandwidth of a bus that connects the image supply device and the processor.

10. The object detection apparatus as claimed in claim 6, wherein the object detection is performed by using a deep learning model and the deep learning model comprises a convolutional neural network (CNN), a recurrent neural network (RNN), or a long short-term memory (LSTM) recurrent neural network.

* * * * *